Figure 5:
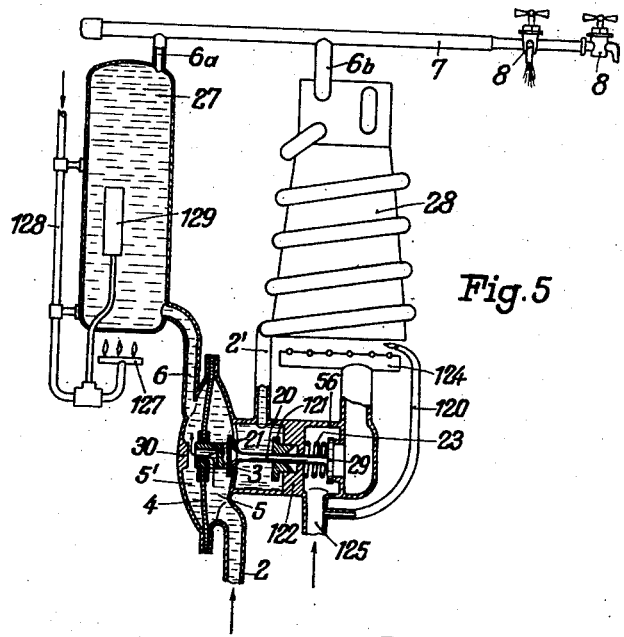

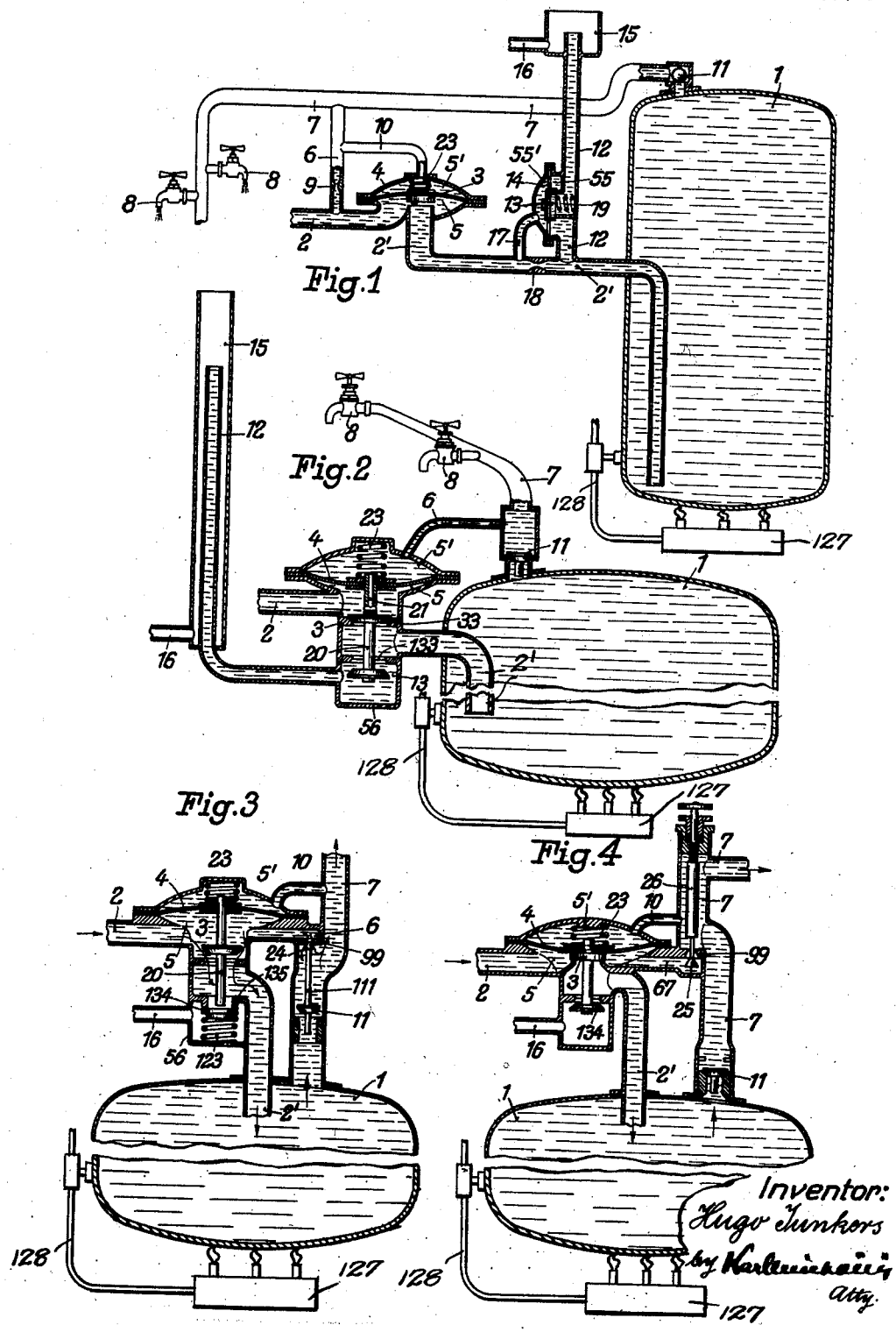

Oct. 8, 1935.　　　　　H. JUNKERS　　　　　2,016,331
HOT WATER SYSTEM
Filed Oct. 20, 1931　　　2 Sheets-Sheet 2

Inventor:
Hugo Junkers
by Karl...
Atty.

Patented Oct. 8, 1935

2,016,331

UNITED STATES PATENT OFFICE 2,016,331

HOT-WATER SYSTEM

Hugo Junkers, Dessau, Germany, assignor to Junkers & Co. G. m. b. H., Dessau, Germany Application October 20, 1931, Serial No. 569,929
In Germany October 24, 1930

8 Claims. (Cl. 137—79)

My invention relates to hot-water systems and more particularly to systems in which tapping stations are supplied with hot water from heaters.

It is an object of my invention to improve a system of this kind. To this end, I provide a heater, which may be a storage reservoir or boiler heated by any source of heat or an instantaneous and flow heater. Both types of heaters are equipped with heating means such as gas burners or the like. The storage-reservoir type of heater is heated permanently so that a supply of hot water is always available, while the instantaneous type is heated intermittently, its heating means being operated only when water flows in the heater.

In combination with this heater or reservoir I provide a pipe for supplying cold water to, and a pipe for tapping hot water from, the heater or reservoir. In the cold-water supply pipe I provide a valve for regulating the flow of cold water to the heater or reservoir and means such as a flexible diaphragm under the control of the pressure gradient from the supply pipe for operating the regulating valve. The supply pipe and the tapping pipe are connected directly by a by-pass for equalizing the pressures in the two pipes. The by-pass is permanently open so that the pressures are equalized independently of the operation of the regulating valve.

In systems of the kind described as designed heretofore the heater is permanently connected to the supply pipe so that, at least during the intervals of the tapping periods the heater is under the full pressure of the water in the supply pipe and must be so strong as to stand this pressure.

By the regulating means and the by-pass according to my invention the heater is disconnected from the supply pipe during the intervals between tapping and connected to the supply pipe only during the tapping periods and the pressures in the supply and in the tapping pipe are equalized between the tapping periods. In this manner the heater will never be subjected to the full pressure of the water supply but only to the reduced tapping pressure. This is particularly important for heating systems having large-capacity storage reservoirs which are heated during the intervals between tapping.

The automatic regulating means referred to also permit equipping a system with several heating units which may be of a different character, for instance static storage reservoirs combined with a flow reservoir, or units of various capacities for alternate operation, or groups of units of equal capacity in which a greater or lesser number of units or groups are operated as required and, by the automatic regulating means according to my invention, the several units or groups are automatically rendered active and inactive in conformity with the hot-water demand.

It is another object of my invention to provide a safety device which cooperates with the regulating means and may be a normal rising pipe. To this end I provide automatic means under the control of the regulating means for cutting out the safety device or rising pipe during tapping, so that it is active only in the intervals between the tapping periods.

In the drawings affixed to this specification and forming part thereof several systems embodying my invention are illustrated diagrammatically by way of example.

In the drawings

Figure 6:
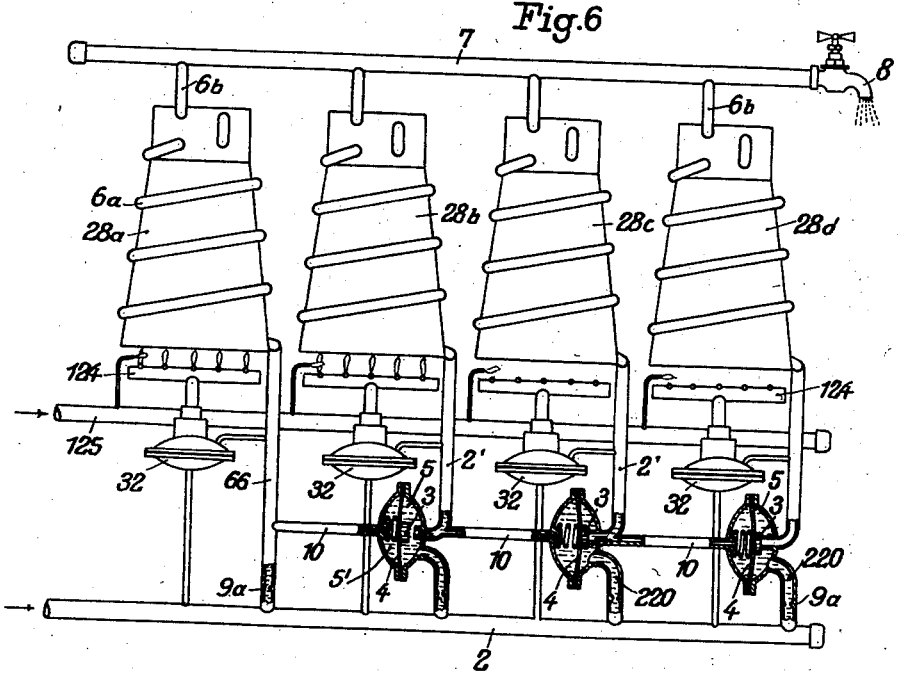

Fig. 1 is a partly sectional elevation of a system having separate means for regulating the flow of cold water to the heater and for cutting out the safety device under the control of the regulating means, Fig. 2 is a sectional elevation of a system in which the regulating and cutting-out means are combined for cooperation, Fig. 3 is a sectional elevation of a system in which the free sectional area of the by-pass between the tapping stations and the supply pipe is regulated by a valve connected to a check valve in the tapping pipe, Fig. 4 is a sectional elevation of a system in which the connection between the cold-water supply pipe and the tapping pipe is regulated by a thermostat, Fig. 5 is a partly sectional elevation showing the combination of a storage reservoir or boiler and an instantaneous or flow heater, and Fig. 6 shows a group of flow heaters which are all connected to the same tapping pipe.

Referring now to the drawings and first to Fig. 1, I is a reservoir which in the present instance is a boiler or storage reservoir which is heated by any suitable means such as a gas burner 127 to which is supplied through a pipe 128, 2 is the cold-water supply pipe, 5, 5' is a valve casing which is connected to the pipe 2, and 2' is a pipe which connects the valve casing to the reservoir 1. 3 is a valve in the casing 5, 5' which is supported by a diaphragm 4 with a closing spring 23. The diaphragm subdivides the casing into the upper chamber 5' and the lower chamber 5. The lower chamber 5 is connected to the pipes 2 and 2' and the valve 3 is seated in this chamber on the upper end of the pipe 2' under the pressure of the spring 23.

7 is the tapping pipe which at one end is connected to tapping stations shown as cocks 8, 8 and to a check valve 11 at the reservoir end. 6 is a pipe which directly connects the supply pipe 2 to the tapping pipe 7 and constitutes the by-pass referred to. 9 is a restriction in the by-pass pipe 6 for generating a pressure gradient in the by-pass, and 10 is a pipe extending from the unrestricted portion of the by-pass pipe 6 to the upper chamber 5' of the valve casing.

12 is a rising pipe which is connected to the pipe 2' at its lower, and to an open collector 15 with a drain 16 at its upper end. 55, 55' is a casing at the rising pipe 12, 13 is a valve, 14 is a diaphragm in the casing, and 19 is a spring which tends to lift the valve 13 off a seat in the rising pipe. The chamber 55 of the casing is connected to the pipe 2' through the rising pipe 12 and the chamber 55' is connected to the pipe 2' through a pipe 17, 18 being a restricted portion in the pipe 2' intermediate the pipes 12 and 17.

Fig. 1 shows the valves 3 and 13 in the positions which they assume when water is tapped at one of the stations 8. The valve 3 is open and the valve 13 is closed. In the intervals between tapping the pressure of the water in the pipe 2 is transmitted to the upper chamber 5' of the valve casing through the pipes 6 and 10 and the valve 3 is seated on the upper end of the pipe 2' by its spring 23. Reaction of the pressure in the pipes 2, 6, and 7 on the water in the reservoir 1 is prevented by the check valve 11 and by the closed valve 3. When water is tapped at 8 the pressure in the pipe 7 is reduced and is made up only gradually from pipe 2 through the restricted portion 9 of the by-pass pipe 6. The pressure in the chamber 5' is reduced also as the chamber 5' is connected to 7 through 6 and 10, and the valve 3 is lifted off its seat. Cold water from the pipe 2 rises in the reservoir 1 through the pipe 2', and heated water is expelled to the tapping station 8 through check valve 11. The valve 13 in the rising pipe 12 is normally held open by its spring 19 and connects the reservoir 1 to the rising pipe 12 through chamber 55. The water under pressure which is admitted to the pipe 2' when the valve 3 opens during a tapping period, is backed up at 18 and, through pipe 17 and chamber 55', forces the valve 13 on its seat, breaking the connection of the pipe 2' with the rising pipe 12 so that the pressure at which the water is tapped, is not limited to that corresponding to the head of water in the rising pipe 12, but may be higher.

The variations of pressure at the valves 3 and 13 may in themselves be sufficient for operating the valves so that the restricted portions 9 and/or 18 in the pipes 6 and 2', respectively, may be dispensed with.

Instead of diaphragms 4 and 14 as shown, pistons or any other suitable means may be provided for controlling the valves 3 and 13. The valve 13 in the rising pipe may be a safety valve as will be described.

It will be understood that the automatic regulating valve 3 is so controlled that it permits water from pipe 2 to flow to the reservoir 1 through pipe 2' if water is tapped, and interrupts the connection when the tapping ceases. Reaction of the pressure in the pipe 2 on the reservoir is prevented by the check valve 11 intermediate the reservoir and the tapping pipe 7. By these means the reservoir is relieved from pressure during the intervals between the tapping periods and is not under the full pressure of the water in pipe 2 during the tapping periods.

The valve 13 in the rising pipe 12 is not indispensable but is preferably provided and so controlled that it is open during the intervals between the tapping periods so that the rising pipe prevents excess of pressure in the reservoir 1, which might occur by the heat expansion of the liquid or if the valve 3 or the valve 11 leaks. If the valve 13 is designed as a safety valve it must open independently of the control by the automatic regulating valve 3.

Referring now to Fig. 2, the arrangement of the several members is substantially the same as that illustrated in Fig. 1 but the valves 3 and 13 are combined into a double-seated valve on a spindle 20 under the control of the diaphragm 4. The valve 3 has a seat 33, and the valve 13 has a seat 133 in a downward extension of the chamber 5 of the valve casing, the pipe 2 being connected to the casing above the seat 33, the pipe 2' intermediate the seats 33 and 133, and the pipe 12 below the seat 133. 21 is a bore in the portion of the valve spindle which extends from the diaphragm 4 to the valve 3. This bore which corresponds to the by-pass pipe 6 in Fig. 1 and replaces the restriction 9, connects the pipe 2 to the pipe 6 which is here connected to the upper chamber 5' at one end and to the tapping pipe 7 at the other.

Referring now to Fig. 3, the valve 3 is arranged substantially as described with reference to Fig. 2 but there is no rising pipe 12 and the lower end of the valve spindle cooperates with a safety valve 134 which is held by a spring 123 on a seat 135 in the casing 56 intermediate the connection of the pipe 2' and the drain 16 to the casing 56. When the valve 3 closes the valve 134 is opened by the spindle 20. When the valve 3 is open as shown in Fig. 3 the spring 123 closes the valve 134 but the valve is free to open if any excess pressure occurs in the reservoir 1.

In this case the restriction 9 in Fig. 1 is replaced by a hole 99 with a needle valve 24 on the spindle 111 of the check valve 11 which is here shown as a mushroom valve and not as a ball, as in Fig. 1. When the check valve 11 opens the needle valve 24 restricts the free area of the opening in the pipe 6 which it controls. A rising pipe is not required in the system illustrated in Fig. 3 because the valve casing 5, 5' is arranged above the reservoir 1.

Referring now to Fig. 4, the arrangement is similar to that shown in Fig. 3 but here the restriction 9 is replaced by a valve 25 on the seat 99 which is controlled by a thermostat member 26 in the tapping pipe 7 above the check valve 11. The seat 99 is connected to chamber 5 by a pipe 67 so that water from 2 has access to the tapping pipe 7 through valve 25.

By providing means, preferably automatic, such as this thermostat control, for varying the amount of cold water admixed to the warm water in the tapping pipe the temperature at the tapping station is regulated.

By providing means for restricting or closing the by-pass, such as the valve 24, Fig. 3, and 25, Fig. 4, excessive admission of cold water to the tapping station through the by-pass is avoided. The valves may be controlled together with the device for regulating the supply of cold water to the by-pass heater, as shown in Fig. 5 for the bore 21.

Referring now to Fig. 5, this shows the combination of a large-capacity storage reservoir or boiler 27 with a flow heater 28. The heaters 27 and 28 are connected to the tapping pipe 7 by pipes 6a and 6b, respectively. A supply of hot water is permanently stored in the storage reservoir 27 which is heated by a burner 127 connected to a gas main 128 as described for the heater 1 in Fig. 1, and, if desired, provided with a thermostatic element 129 in the reservoir 27. The pipes 2 and 2' are under the control of the valve 3 in the casing 5, 5' as described which is here arranged in vertical position. The storage reservoir 27 is connected to the chamber 5' of the casing by pipe 6 and the valve 3 has a bore 21 adapted to cooperate with a seat 30 in the wall of the chamber 5' for controlling the flow through the bore 21. 29 is a valve in the gas main 125 by which the burner 124 of the circulation heater is supplied, 120 is an igniting jet for the burner 124 and 23 is the spring which tends to seat the valves 3 and 29 together. This spring is here arranged on the spindle 20 and abutted on a partition 122 in the casing 56, with a stuffing box 121.

It will be understood that in this case the connection of the pipe 2 to the storage reservoir 27 and the tapping pipe 6 by-passes the flow heater 28, and the valve 3 for controlling the water supply to the flow heater 28 is controlled by the flow from pipe 2 to the by-passed heater 27. In this manner if the demand is small, it is supplied only from the storage reservoir 27, while if it is high the flow heater 28 begins to operate, as follows: If a small quantity of water is tapped at one of the stations 8 cold water from bore 21 is admitted to the pipe 6 and expels the heated water in the storage reservoir 27 through pipe 6a and tapping pipe 7. If the demand is higher the reduction of pressure in the bore 21 causes the diaphragm 4 to be deflected, the valve 3 is opened and water from 2 is admitted to the flow heater 28 the burner 124 of which at the same time is supplied with gas from main 125 through valve 29. The deflection of the diaphragm causes the flow past the seat 3 toward the storage reservoir 27 to be restricted so that water is now delivered to the tapping stations 8 practically exclusively through the flow heater 28.

Referring now to Fig. 6 this shows a plurality, in the present instance four, flow heaters 28a–28b connected to a tapping pipe 7 by pipes 6b. Three valve casings 5, 5' with the valves 3 are arranged as described with reference to Fig. 1 but in vertical position, their chambers 5 being connected to the pipe 2 by suitable branch pipes 220, each with a restriction 9a, while the chamber 5' in each casing is connected to the seat of the valve 3 in the adjacent chamber 5 with the exception of the first casing. The valve 3 in each casing controls the connection of the pipe 2' to the corresponding heaters 28b, 28c, 28d, as described for the heater 1 with reference to Fig. 1. The first heater 28a is connected to the pipe 2 by a pipe 66 with a restriction 9a. This pipe 66 is connected to the chamber 5' of the casing for the heater 28b by a pipe 10 so that the pressure reduction in the pipe 66 controls the flow of the liquid to the heater 28b. Similarly the pressure in this heater controls the valve 3 of the heater 28c, and so on. 32 are control apparatus of known type which are connected to the pipe 2 and the pipes 66 and 2', respectively, for regulating the supply of gas from the main 125 to the burners 124 in conformity with the flow of water. In the heaters 28b, 28c and 28d the supply of gas might be controlled directly by the diaphragms 4 in the several casings 5, 5'.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:

1. A hot-water system comprising a heater, a pipe for supplying cold water to, and a pipe for tapping hot water from, said heater, a check valve intermediate said heater and said tapping pipe for preventing return flow from said heater to said tapping pipe, a valve in said cold-water supply pipe for controlling the flow of cold water to said heater, means controlled by the pressure gradient from said supply pipe to said tapping pipe for operating said valve, a relief valve in the portion of the supply pipe which extends from said controlling valve to said heater, and a by-pass directly connecting said supply pipe to said tapping pipe for equalizing the pressures in said supply and said tapping pipe.

2. A hot-water system comprising a heater, a pipe for supplying cold water to, and a pipe for tapping hot water from, said heater, a valve in said cold-water supply pipe for controlling the flow of cold water to said heater, means controlled by the pressure gradient from said supply pipe to said tapping pipe for operating said valve, a relief valve which is operatively connected to said controlling valve and adapted to connect said heater to a space in which the pressure is lower than in said heater, and a by-pass directly connecting said supply pipe to said tapping pipe for equalizing the pressures in said supply and said tapping pipe.

3. A hot-water system comprising a heater, a pipe for supplying cold water to, and a pipe for tapping hot water from, said heater, a valve in said cold-water supply pipe for controlling the flow of cold water to said heater, means controlled by the pressure gradient from said supply pipe to said tapping pipe for operating said valve, a loaded safety valve adapted to connect said heater to a space in which the pressure is lower than in said heater, and to be opened by said controlling valve and by the pressure in said heater, and a by-pass directly connecting said supply pipe to said tapping pipe for equalizing the pressures in said supply and said tapping pipe.

4. A hot-water system comprising a heater, a pipe for supplying cold water to, and a pipe for tapping hot water from, said heater, a valve in said cold-water supply pipe for controlling the flow of cold water to said heater, means controlled by the pressure gradient from said supply pipe to said tapping pipe for operating said valve, a relief valve adapted to connect said heater to a space in which the pressure is lower than in said heater, and to be opened by said controlling valve, means positively connecting said controlling valve to said relief valve, and a by-pass directly connecting said supply pipe to said tapping pipe for equalizing the pressures in said supply and said tapping pipe.

5. A hot-water system comprising a heater, a pipe for supplying cold water to, and a pipe for tapping hot water from, said heater, a casing subdivided into two compartments, one of which is connected to said supply pipe, and the other to said tapping pipe, a valve in said casing for controlling the flow of cold water to said heater, means controlled by the pressure gradient between said compartments for operating said valve, and a by-pass directly connecting said supply pipe to said tapping pipe for equalizing the pressures in said supply and said tapping pipe.

6. A hot-water system comprising a heater, a pipe for supplying cold water to, and a pipe for tapping hot water from, said heater, a valve in said cold-water supply pipe for controlling the flow of cold water to said heater, means controlled by the pressure gradient from said supply pipe to said tapping pipe for operating said valve, a by-pass directly connecting said supply pipe to said tapping pipe for equalizing the pressures in said supply and said tapping pipe, and means controlled by the flow in said tapping pipe for varying the free sectional area of said by-pass.

7. A hot-water system comprising a heater, a pipe for supplying cold water to, and a pipe for tapping hot water from, said heater, a valve in said cold-water supply pipe for controlling the flow of cold water to said heater, means controlled by the pressure gradient from said supply pipe to said tapping pipe for opening said valve when a pressure gradient is established by tapping from said tapping pipe, and for closing said valve when the pressure gradient is removed by interrupting the tapping, a by-pass directly connecting said supply pipe to said tapping pipe for equalizing the pressures in said supply and said tapping pipe, and means in said by-pass for generating a pressure gradient therein.

8. A hot-water system comprising a heater, a pipe for supplying cold water to, and a pipe for tapping hot water from, said heater, a valve in said cold-water supply pipe for controlling the flow of cold water to said heater, a by-pass directly connecting said supply pipe to said tapping pipe for equalizing the pressures in said supply pipe and said tapping pipe, means in said by-pass for generating a pressure gradient therein and means controlled by the pressure gradient in said by-pass for opening said valve when a pressure gradient is established by tapping from said tapping pipe, and for closing said valve when the pressure gradient is removed by interrupting the tapping.

HUGO JUNKERS.